US011790348B2

(12) United States Patent
Patel

(10) Patent No.: US 11,790,348 B2
(45) Date of Patent: Oct. 17, 2023

(54) PROGRAMMABLE CURRENCY PLATFORM

(71) Applicant: Amol Patel, Sunnyvale, CA (US)

(72) Inventor: Amol Patel, Sunnyvale, CA (US)

( * ) Notice: Subject to any disclaimer, the term of this patent is extended or adjusted under 35 U.S.C. 154(b) by 505 days.

(21) Appl. No.: 16/447,799

(22) Filed: Jun. 20, 2019

(65) Prior Publication Data

US 2020/0005281 A1 Jan. 2, 2020

Related U.S. Application Data

(60) Provisional application No. 62/692,624, filed on Jun. 29, 2018.

(51) Int. Cl.
| | | |
|---|---|---|
| *G06Q 20/36* | (2012.01) | |
| *G06K 19/04* | (2006.01) | |
| *G06Q 20/40* | (2012.01) | |
| *G06Q 20/32* | (2012.01) | |
| *G06Q 20/22* | (2012.01) | |
| *G06Q 20/34* | (2012.01) | |

(52) U.S. Cl.
CPC ....... *G06Q 20/3672* (2013.01); *G06K 19/047* (2013.01); *G06Q 20/2295* (2020.05); *G06Q 20/3255* (2013.01); *G06Q 20/363* (2013.01); *G06Q 20/3678* (2013.01); *G06Q 20/405* (2013.01); *G06Q 20/3223* (2013.01); *G06Q 20/3278* (2013.01); *G06Q 20/351* (2013.01)

(58) Field of Classification Search
None
See application file for complete search history.

(56) References Cited

U.S. PATENT DOCUMENTS

| | | | | |
|---|---|---|---|---|
| 7,590,601 B2 * | 9/2009 | Shea | ...................... | G06F 21/10 235/379 |
| 8,229,859 B2 * | 7/2012 | Samid | .................. | G06Q 20/223 705/69 |
| 2013/0311348 A1 * | 11/2013 | Samid | .................... | G06Q 40/04 705/37 |
| 2016/0005014 A1 * | 1/2016 | Shea | ..................... | G06Q 20/123 705/39 |
| 2016/0012465 A1 * | 1/2016 | Sharp | ................... | G06Q 20/386 705/14.17 |
| 2017/0046290 A1 * | 2/2017 | Samid | ................ | G06Q 20/3678 |
| 2017/0249607 A1 * | 8/2017 | Samid | ................ | G06Q 20/0655 |
| 2020/0005281 A1 * | 1/2020 | Patel | ..................... | G06Q 20/123 |

* cited by examiner

*Primary Examiner* — Jamie R Kucab
(74) *Attorney, Agent, or Firm* — Perkins Coie LLP; Louis Yang; Colin Fowler

(57) ABSTRACT

Disclosed is a currency management application to facilitate customized transfer of value between two parties via a digital coin. The digital coin can be personalized and programmed. For example, the digital coin can be personalized with a set of attributes, such as a design, color, shape or theme, and can be programmed with a set of rules, such as where the digital coin can be redeemed and/or who the digital coin can be transferred to. The digital coin is associated with a value, which is determined in terms of a fiat currency or cryptocurrency. This digital coin can be used for peer to peer payments, merchant payments and redeemable/withdrawn through a financial institution, such as a bank account.

44 Claims, 11 Drawing Sheets

PROGRAMMABLE CURRENCY PLATFORM

CROSS-REFERENCE TO RELATED APPLICATION(S)

This application claims the benefit of U.S. Provisional Application Ser. No. 62/692,624 titled "PERSONALIZED AND PROGRAMMABLE CURRENCY PLATFORM" filed Jun. 29, 2018, which is incorporated herein by reference for all purposes in its entirety.

BACKGROUND

Creativity and personalized expression are at the core of some of the most successful digital platforms. For example, Instagram, Snapchat and Facebook for photo/video sharing, and Minecraft, Roblox and Fortnite for games. No such platform for personalized engagement exists for currency, and we believe that is a huge opportunity for innovation.

The personalization of a gift card is restricted to the designs decided by the issuer of the gift card, hence limiting the customization and personalization associated with the stored value transfer between two participants (giver and receiver).

Most of the stored value cards or P2P transfer accounts are controlled by a centralized platform and processed through it. For example, if you have a gift card, voucher or a digital account such as PayPal/Venmo, your account with the stored value will be at this centralized processor. While it is secure, it is still vulnerable to hacks and inherent risks around centralized control. At any time, the processor can make changes in their policy and control the account.

Current payment systems were conceived to be used by humans, but with the advent of bots, artificial intelligence, drones and IoT devices, soon there will be significant amount of transactions done by and between machines, and the current value transfer mechanisms are inadequate for that.

DETAILED DESCRIPTION

Embodiments are directed to a currency management application to facilitate customized transfer of value between two parties via a digital coin. The digital coin can be personalized and programmed. For example, the digital coin can be personalized with a set of attributes, such as a design, color, shape or theme, and can be programmed with a set of rules, such as where the digital coin can be redeemed and/or who the digital coin can be transferred to. The digital coin is associated with a value, which is determined in terms of a fiat currency or cryptocurrency. This digital coin can be used for peer to peer payments, merchant payments and redeemable/withdrawn through a financial institution, such as a bank account.

Figure 1:
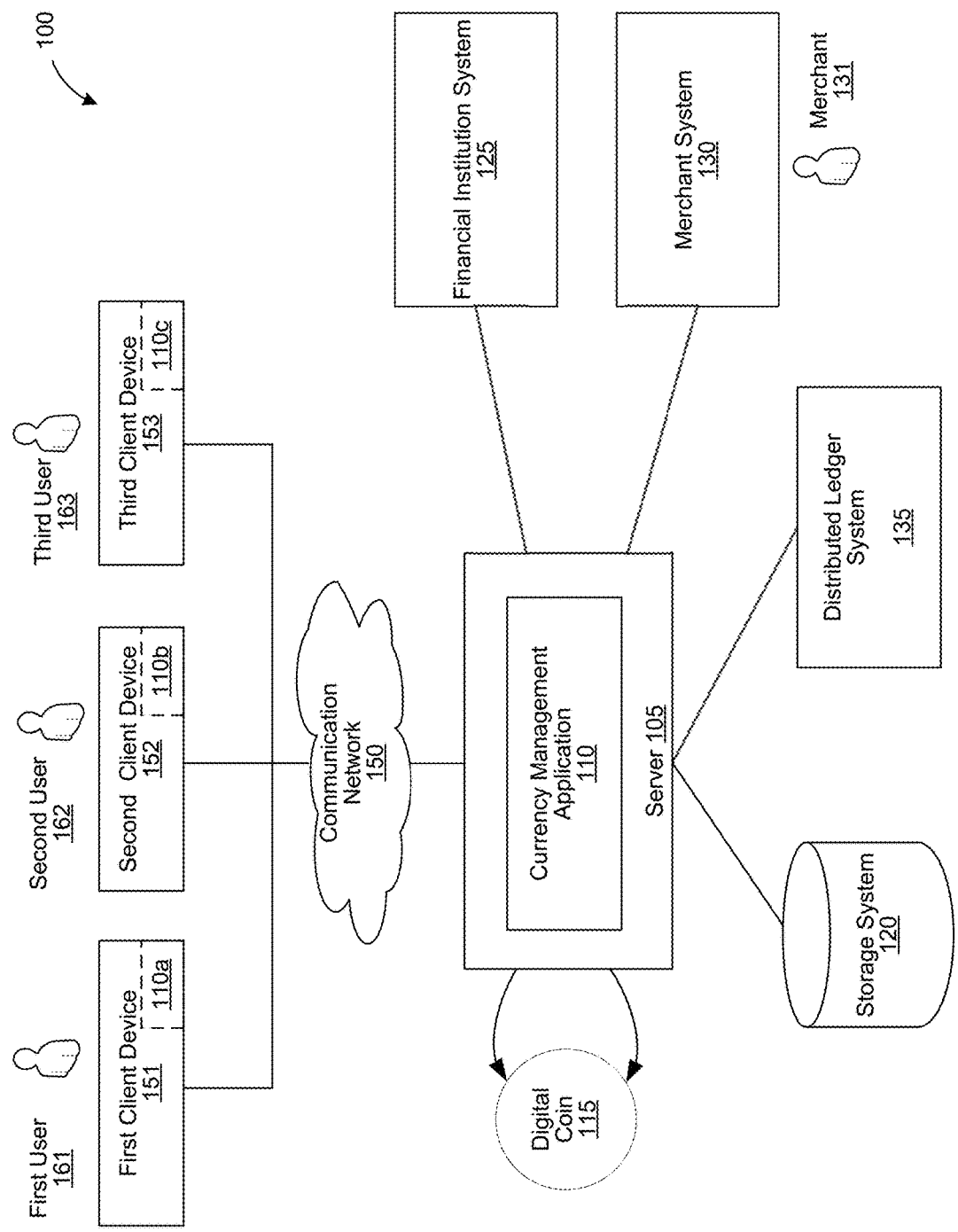
FIG. 1 is a block diagram of an environment in which the disclosed embodiments can be implemented.

Turning now to FIG. 1, FIG. 1 is a block diagram of an environment 100 in which the disclosed embodiments can be implemented. The environment 100 includes a currency management application 110 that facilitates creation of a digital coin 115, transfer of the digital coin 115 or redeeming of the digital coin 115. The currency management application 110 can be implemented on a server device 105 ("server"), e.g., as a website, and can be accessed from a web browser application on a client device. In some embodiments, the currency management application 110 is implemented as a mobile app, such as mobile apps 110a-110c, that can be downloaded onto a client device, e.g., from an app store hosted on a server device (not illustrated) and installed on the client device. The client device, such as client devices 151-153, can be any of a variety of computing devices, e.g., a desktop computer, a laptop computer, a smartphone, a tablet PC, a wearable device, that is capable of communicating with the server 105 over a communication network 150, e.g., Internet, Intranet, or Local Area Network (LAN).

A user can create the digital coin 115 using the currency management application 110. For example, a first user 161 can access the currency management application 110 using the first client device 151 and create the digital coin 115. In creating the digital coin 115, the first user 161 may customize/personalize/program the digital coin 115 with attributes, rules and value. An attribute can be one or more of a color, shape, theme, design, template, tag, geo-location, special effects, text, image, video, audio, virtual and augmented reality integrations associated with the digital coin 115. For example, the first user 161 can customize the digital coin 115 to be a round shape of a specified color, add an image and name of the first user 161 to the digital coin 115. FIG. 2 shows an example graphical representation of a digital coin.

The first user 161 can also set rules on the digital coin 115. For example, a rule can specify who can accept the digital coin 115, who can use the digital coin 115, what can the digital coin 115 be used for (e.g., a particular good or service), whether the digital coin 115 be shared, passed or redeemed for goods and services. The rules can also specify whether the digital coin 115 once transferred to another user, whether the other user can further change—add, modify or delete —the attributes and/or rules associated with the digital coin 115. Note that the above attributes and rules are just examples and actual attributes and rules that can be set for the digital coin 115 are not restricted to the above examples.

The first user 161 can set a value to the digital coin 115. The value can be in terms of fiat currency, such as a dollar, or in terms of cryptocurrency, such as bitcoin. For example, the first user 161 can set the value of the digital coin 115 as "$25." When the first user 161 funds the digital coin 115, an amount corresponding to the value of the digital coin 115 can be debited from a funding source of the first user 161. For example, the currency management application 110 communicates with a financial institution system 125 associated with a financial institution, such as a bank, to debit a bank account of the first user 161 for the amount. In some embodiments, the financial institution system 125 is a computer system associated with the financial institution. In some embodiments, the funding source can be through one or more of a credit card, a debit card, any electronic funds-transfer system such as automated clearing house (ACH), or an online wallet, including a cryptocurrency wallet.

The first user 161 can share the digital coin 115 with one or more users using one or more means such as email, text message, social network, or in-app sharing. For example, the first user 161 can share the digital coin 115 with the second user 162 via email, text message, third party social network, and/or with third user 163 via in-app sharing. In some embodiments, sharing a digital coin can include gifting, making a peer-to-peer ("p2p") payment, or transferring the digital coin to another user. The digital coin 115 can be shared with both members or non-members of the currency management application 110. In some embodiments, a member of the currency management application 110 is a user who has created a wallet account in the currency management application 110. When the digital coin 115 is shared with a member, the member can receive a notification in the mobile app on the client device, and can access the digital coin 115 in the mobile app. When the digital coin 115 is shared with a non-member, e.g., via a text message to a phone number associated with the non-member, the non-member is prompted to create a wallet account with the currency management application 110 upon receiving the text message. The non-member can download the mobile app of the currency management application 110, create a wallet account in the mobile app and then access the digital coin 115 in the mobile app. In some embodiments, a user, such as a non-member, may be able to use the digital coin 115 without creating a wallet account with the currency management application 110. For example, when the digital coin 115 is shared with a non-member, e.g., via an email, the digital coin 115 can be redeemed at a merchant using a bar code associated with the digital coin 115 via near field communications (NFC).

The digital coin 115 can be used to redeem at a merchant, such as a merchant 131. A merchant can be a provider of goods or services. For example, the first user 161 can redeem the digital coin 115 at the merchant 131, which, for example, can be a restaurant. The currency management application 110 will have a virtual card (with a standard third-party payments rail like Visa) associated with the wallet of user 161. The digital coin 115 can be used at the merchant 131 for redemption via the virtual card, so that a direct integration of merchant system 130 with the currency management application 110 may not be required. The virtual card can also be integrated with a mobile wallet or mobile payment system, such as Apple Pay from Apple® of Cupertino, Calif. In some embodiments, the currency management application 110 can also generate a bar code with the digital coin 115, which can be scanned by the merchant 131 on the first client device 151 to obtain the payment from the first user 161. The payment to the merchant 131 can be settled through a payment gateway of the financial institution. For example, when the merchant 131 detects the virtual card (via card swipe or NFC or similar), a merchant system 130 associated with the merchant 131 communicates with the financial institution system 125 of a financial institution, such as Visa or Mastercard, to obtain the payment. When the merchant 131 scans the barcode of the digital coin 115, the merchant system 130 connected to the currency management application 110 settles the transaction by debiting the wallet account of the first user 161 and crediting the merchant 131's account. In some embodiments, the merchant system 130 is a computer system associated with the merchant 131. After the payment is successful, the currency management application 110 reduces the value of the digital coin 115 by the payment amount.

In some embodiments, the digital coin 115 can be redeemed with a financial institution. For example, the first user 161 can transfer the value of the digital coin 115 to a bank account associated with the first user 161 using the mobile app on the first client device 151. When the first user 161 initiates the transfer to the bank account, the currency management application 110 communicates with the financial institution system 125 to transfer the value to the bank account of the first user 161.

A digital coin can also be generated by a merchant. For example, the digital coin 115 can be generated by the merchant 131. The merchant 131 can access the currency management application 110 on the server 105 or the mobile app on the merchant system 130 and generate the digital coin 115, e.g., as described above. The merchant 131 can customize the digital coin 115 by setting the attributes, rules including but not limited to sharing, offers, loyalty programs, funding sources allowed and set an initial value of the digital coin 115. The merchant 131 can generate a number of such digital coins, and sell or gift the digital coins to other users, e.g., customers of the merchant 131.

In some embodiments, the currency management application 110 also allows the merchant 131 to load value, offers and special privileges on a digital coin generated and designed by the first user 161.

While the digital coins can be transferred or requested between users, the digital coins can also be requested or transferred by and between computing devices such as Internet of Things (IoT) devices. For example, a smart washing machine can sense that it is running out of detergent, place an order with a local store, and the store's drone can deliver the detergent and collect money (via digital coins programmed (e.g., setting rules) by the owner of the washing machine).

The currency management application 110 allows a user to create and manage a wallet account and perform other digital coin related transactions. The currency management application 110 allows account creation using user information such as an email address/mobile number of the user or using third-party identity networks like Facebook, Google, or LinkedIn. A rules module of the currency management application 110 allows a user to set rules for a digital coin. For example, the rules module allows the merchant 131 to set policies and rules for their customers, employees or partners (affiliates, marketing and channel sales partners) to accrue digital coins, and rules on how these digital coins can be redeemed either on the merchant 131, the merchant's affiliate network as defined by the merchant 131, or any other merchant.

The currency management application 110 can include a dashboard, which is a graphical user interface (GUI), that provides a real time view of the digital coins issued, their value, customer details and ownership distribution of all the digital coins of the merchant 131. The dashboard can include filters that enable advanced data analytics, geo-spatial velocity graph of their issued tokens, heat maps of coin activity in a specified location. The dashboard can also generate loyalty graph of users for merchants. In some embodiments, the coin activity includes any transaction associated with a digital coin, such as sharing or redemption of the digital coin. For example, the coin activity can include a date and time a digital coin is generated, transferred, requested and/or redeemed. In another example, the coin activity can include user identifiable information, such as name, user id, email, telephone number, age, or gender, of a user who has transferred and/or received the digital coin to whom/from whom. In another example, the coin activity can include information of goods or service for which a digital coin was redeemed. In another example, the coin activity can include a location, e.g., address, country, state, city, and/or a zip code, where the transaction is performed. In another example, the coin activity can include information regarding how the digital coin is redeemed, e.g., via the bar code, virtual credit card, online purchase, point of sale purchase etc.

In some embodiments, the first user 161 can share a digital coin amongst a pre-defined set of users to accrue value (e.g. collecting funds for the birthday of the second user's 162, a school field trip, donations, etc). The dashboard can provide a real-time status of key process indicators like target amount, shortfall, number of users who have contributed and yet to contribute, etc.

The currency management application 110 can also include a predictive analytics module, which can leverage machine learning and artificial intelligence techniques, to provide various analytics to the merchant 131 such as customer segmentation, spending patterns, cohort analysis, suggestions for marketing campaigns (which can be based on merchant affinity score). In some embodiments, the merchant affinity score of a user is indicative of how relevant and/or valuable the user is to a merchant. The currency management application 110 can determine the affinity score as a result of coin activity of the user and/or other users related to the merchant. In some embodiments, the currency management application 110 determines that a particular user is an "influencer" for the merchant 131 if the merchant affinity score of the particular user exceeds a specified threshold. Such analytics can be used by the merchant 131 to generate marketing campaigns directed to the particular user or groups of users who can influence other users to transact with merchant 131, which can result in being beneficial to the business of the merchant 131.

The currency management application 110 allows the digital coin 115 to be programmed with a static value or a dynamic value. In some embodiments, the static value of the digital coin 115 is a value of the digital coin 115 that does not change (unless the user redeems the value or loads additional value to the digital coin 115) once the value is set. On the other hand, the dynamic value of the digital coin 115 is a value that can change (e.g., increase or decrease). For example, the digital coin 115 can be programmed to have a value that changes based on number of times the digital coin 115 is shared between users. Continuing with the example, the value of the digital coin 115 can algorithmically increase as the number of times the digital coin 115 shared between the users increases, or the number of times the digital coin 115 is redeemed at a particular merchant increases. In another example, a community or an association can issue a game day digital coin on the day of a game and can set the value of the digital coin to increase as the number of points scored by a particular player or team increases. In another example, market forces of supply and demand can dynamically determine the value of limited-edition coins.

The currency management application 110 allows the users to create a digital coin whose value expires if not redeemed/shared within a specified time from when it is generated or shared with a particular user.

The currency management application 110 allows the users to merge and split a digital coin. For example, a "$1" digital coin can be split into ten "10" cent digital coins by the owner of the digital coin. Conversely, ten "10" cent digital coins can be merged into a single "$1" digital coin.

The currency management application 110 includes a remote "kill" feature that can invalidate/deactivate a digital coin, which can prevent the digital coin from being redeemed and/or shared. For example, if the merchant 131 suspects fraud in the use of a digital coin issued by them or currency management application 110 detects usage not in conformance of the law or acceptable use policy, the merchant 131 and/or currency management application 110 can deactivate the digital coin by activating the remote kill feature for that digital coin.

The currency management application 110 can also include social network features such as connecting with other users of the currency management application 110, inviting users to the currency management application 110 through third-party social networks like Facebook, Snapchat, Twitter, LinkedIn, and viewing another user's coin collection directly or via social networks. The currency management application 110 can also include social network features such as, indicating relationships between the users, such as parent/child account relationships. In some embodiments, the parent/child account relationships can be dynamically created so that authorized digital coins can be shared peer-to-peer or on social media without the recipient having to go through a wallet creation to be able to use the digital coins. For example, a parent user can give a digital coin 115 to a child user for an allowance. The currency management application 110 can allow the child user to share, redeem, or load value to the digital coin 115 without a wallet account of the child user. The currency management application 110 can allow the creation of a child user account, which can be linked to a parent user account, and all transactions from the child user account will be carried from the parent user wallet account. The child user account can be set to ask for permission from the parent user prior to performing a transaction using the digital coin 115. The parent user can permit or deny a transaction of the child user. In some embodiments, user accounts are different from the wallet account. A user account corresponds to a user profile in the currency management application 110 and a wallet account is an account within the user account that is linked to a funding source. In some embodiments, any user who would like to use the currency management application 110 may be required to create a user account.

The currency management application 110 also allows messaging and notifications programmed by the creator of the digital coin which can be triggered by events related to the digital coin. For example, the second user 162 may get a notification in the mobile app on the second client device 152 when the first user 161 shares the digital coin 115 with the second user 162.

The currency management application 110 also provides an option for the users to generate physical copy of the digital coins, e.g., using 3D printing technology.

While the digital coins can be used by consumers, such as users 161-163, at merchants, the digital coins can also be used for making payments between business entities. For example, digital coins can be issued by a treasury department of a large enterprise to settle with its customers and vendors/suppliers thereby reducing operating costs.

The currency management application 110 also enables multi-party collaboration in creating or modifying a digital coin. For example, the currency management application 110 can let the merchant 131 create the digital coin 115 and load value to the digital coin 115 for use at a partner merchant, who may further customize the digital coin 115, e.g., add an image to the digital coin 115 and/or add offers. The merchant 131 may transfer the digital coin 115 to the first user 161, who may further customize the coin, e.g., add an image to the digital coin 115 and/or load more value to the digital coin 115 for redeeming at the partner merchant.

The digital coin 115 can facilitate in enhancing an experience of the user and creating value for one or more merchants based on the user's experience. For example, the currency management application 110 can analyze the coin activity of a user and determine that a movie going experience of the first user 161 can include a rideshare service for driving to and from a cinema, dining at a restaurant, a drink with friends at a bar etc. Based on this spending pattern, the currency management application 110 can facilitate the various merchants to gain from the user's experience. For example, the currency management application 110 can suggest a pair of merchants, e.g., a merchant associated with the cinema and a merchant associated with a restaurant, to add an offer to the digital coin 115 such as "10% off at Green's Restaurant" for buying a movie ticket at "Drive-in Movies." This can create value for both merchants as the first user 161 may want to go the "Drive-in Movies" instead of another one because of the offer from the restaurant, and the restaurant is gaining a new customer or more business from an existing customer. This way, the currency management application 110 can enhance the experience of the first user 161 and also generate value for one or more merchants based on the knowledge gained from the user's experience.

The currency management application 110 also supports augmented reality (AR) based features. In some embodiments, a user can discover and/or buy a digital coin using AR feature of the currency management application 110. For example, a restaurant can run a campaign in which a customer gets a digital coin if the customer, when physically located at the restaurant, checks-in to the restaurant on a social network and then points the camera of a mobile device of the customer to a particular dish. The currency management application 110 can generate a digital coin using AR techniques and superimpose the digital coin 115 on the image of the particular dish in the mobile device, which the customer can claim. Additionally, the digital coin 115 can have a "10% off" offer for the particular dish. The currency management application 110 can also include various such gamification features wherein the users can discover a digital coin by performing one or more activities specified by a merchant, another user or entity.

The environment 100 includes a storage system 120 for storing a variety of information. For example, the currency management application 110 can store user account details of the users of the currency management application 110 in the storage system. The user account details can include a name, contact information (email, phone number, social networks the user is associated with) and other user identifiable information. The storage system 120 can also store the coin activity, a transaction and modification history of the digital coins, and the corresponding user's provenance. In some embodiments, the storage system 120 can also store a design/graphical representation of the digital coin 115 created by the users and/or merchants. In some embodiments, at least some of the information in the storage system 120 is stored in a secure way, e.g., encrypted using one or more encryption techniques.

In some embodiments, the currency management application 110 stores the coin activity in a distributed ledger system 135, such as Blockchain, instead of or in addition to the storage system 120. A blockchain is a growing list of records, called blocks, which are linked using cryptography. Each block contains a cryptographic hash of the previous block, a timestamp, and transaction data (e.g., coin activity). By design, a blockchain is resistant to modification of the data. It is "an open, distributed ledger that can record transactions between two parties efficiently and in a verifiable and permanent way". For use as a distributed ledger, a blockchain is typically managed by a peer-to-peer network collectively adhering to a protocol for inter-node communication and validating new blocks. Once recorded, the data in any given block cannot be altered retroactively without alteration of all subsequent blocks, which requires consensus of the network majority. Although blockchain records are not unalterable, blockchains may be considered secure by design. The currency management application 110 also supports a smart contract, which can govern behavior of each digital coin to enforce the rules. In some embodiments, smart contracts are self-executing contracts with the terms of the agreement between buyer and seller being directly written into lines of code. The code and the agreements contained therein exist across a distributed, decentralized blockchain network.

In some embodiments the public ledger system of Blockchain or a similar technology (or permissioned or private blockchain) will provide the security, ownership of the tokens and will be used for authentication of a new transaction by the participants. This will significantly reduce the cost of approving and authorizing the transactions for transfers between network participants. In some embodiments, the currency management application 110 can show the coin activity, e.g., movement of digital coins between consumers and between merchants/businesses and customers without sharing the personally identifiable information (PII) unless authorized.

Figures 2A, 2B:
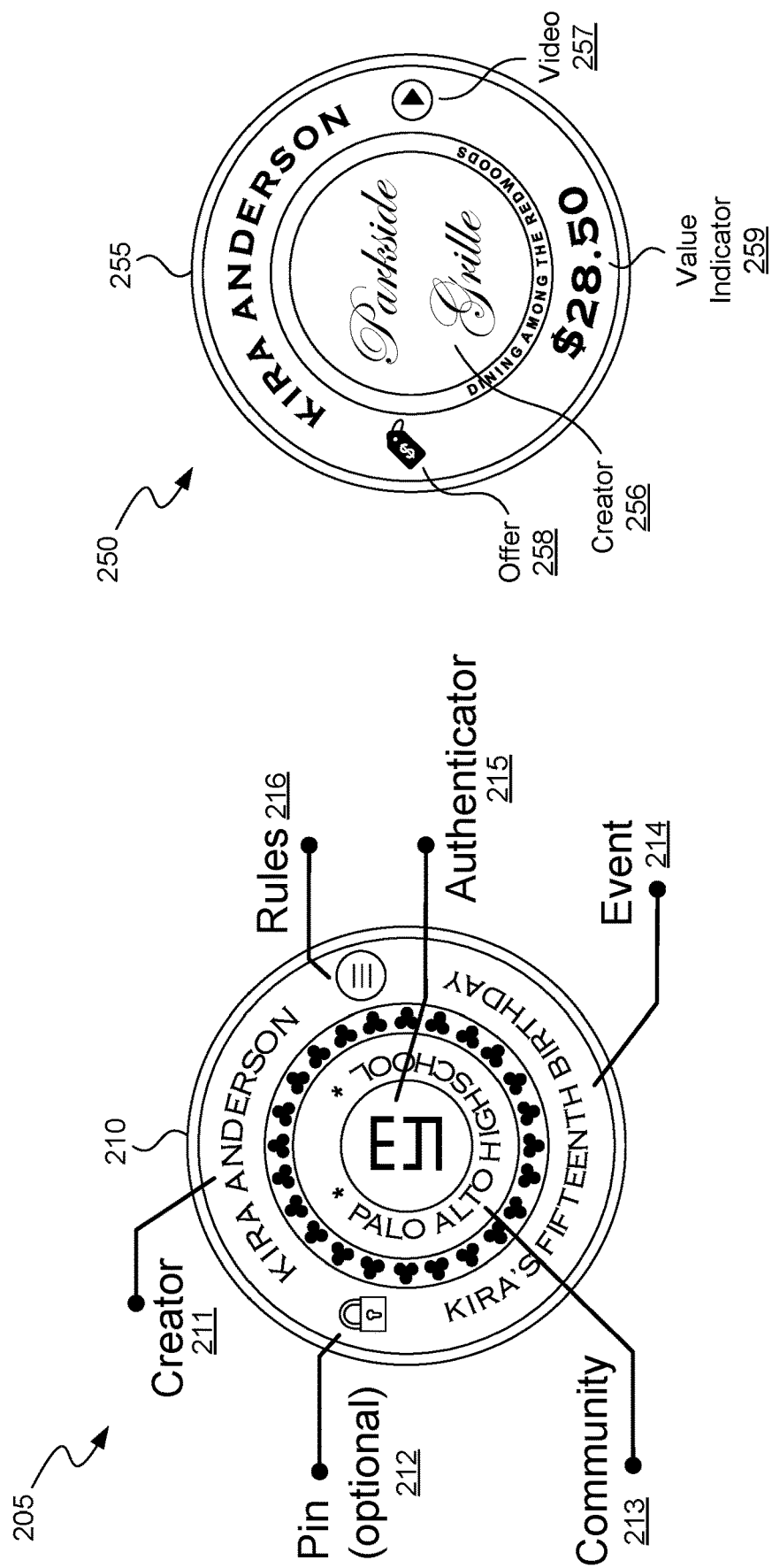
FIG. 2A is a graphical representation of a user-generated digital coin, consistent with various embodiments.
FIG. 2B is a graphical representation of a merchant-generated digital coin, consistent with various embodiments.

FIG. 2A is a graphical representation 205 of a user-generated digital coin 210, consistent with various embodiments. In some embodiments, the digital coin 210 is similar to the digital coin 115 of FIG. 1. The digital coin 210 is customized with a set of attributes as indicated in the graphical representation 205. For example, the graphical representation 205 indicates that the digital coin 210 is of a circular shape, of a specified size, style, theme and color. The digital coin 210 can be programmed to include a creator attribute 211, which indicates the name of the user who created the digital coin 210, such as the first user 161. The digital coin 210 can be programmed to include a personal identification number (PIN) attribute 212, which indicates that the digital coin 210 is associated with a PIN and that the digital coin 210 can be unlocked upon entering the PIN.

The digital coin 210 can be programmed to include a community attribute 213, which indicates the name of a community, such as a high school the first user 161 is affiliated with. The digital coin 210 can be programmed to include an event attribute 214, which indicates the event for which the digital coin 210 is created. The digital coin 210 can be programmed to include an authenticator attribute 215, which indicates that the digital coin 210 is associated with an authenticator and that the digital coin 210 has to be authenticated using the authenticator for redeeming or transferring the digital coin 210. The digital coin 210 can be programmed to include a rules indicator 216, which be used to set, modify and/or view the rules associated with the digital coin 210. These rules may be about value, usage of the coin, business rules for benefits to the community that may be accrued upon usage of the coin, etc.

The first user 161 can generate one or more digital coins such as digital coin 210 and use them to purchase goods or services from a merchant, make P2P transfers to other users, gift other users, etc.

FIG. 2B is a graphical representation 250 of a merchant-generated digital coin 255, consistent with various embodiments. In some embodiments, the digital coin 255 is similar to the digital coin 115 of FIG. 1. The digital coin 255 can be generated by merchant 131, which can be an entity such as a restaurant. The digital coin 255 can be programmed to include a creator attribute 256, which indicates the name of the merchant who created the digital coin 255. The digital coin 255 can be programmed to include a video attribute 257, which indicates that the digital coin 255 is associated with one or more videos that can be played from the coin. The video can be, for example, a commercial associated with the merchant 131. In some embodiments, the digital coin 255 can be programmed to provide an offer, such as "10% off," to the holder of the digital coin 255 upon viewing the video. The digital coin 255 can be programmed to include an offer attribute 258, which indicates that the digital coin 255 is associated with one or more offers. An offer can be, for example, "10% off on a total purchase amount" at the merchant 131. The digital coin 255 can be programmed to include a value indicator 259, which displays the value (or a remaining value) of the digital coin 255. The value of the digital coin may be added by a merchant or a consumer.

The merchant 131 can generate one or more digital coins such as the digital coin 255 and sell or gift them to users.

Figure 2C:
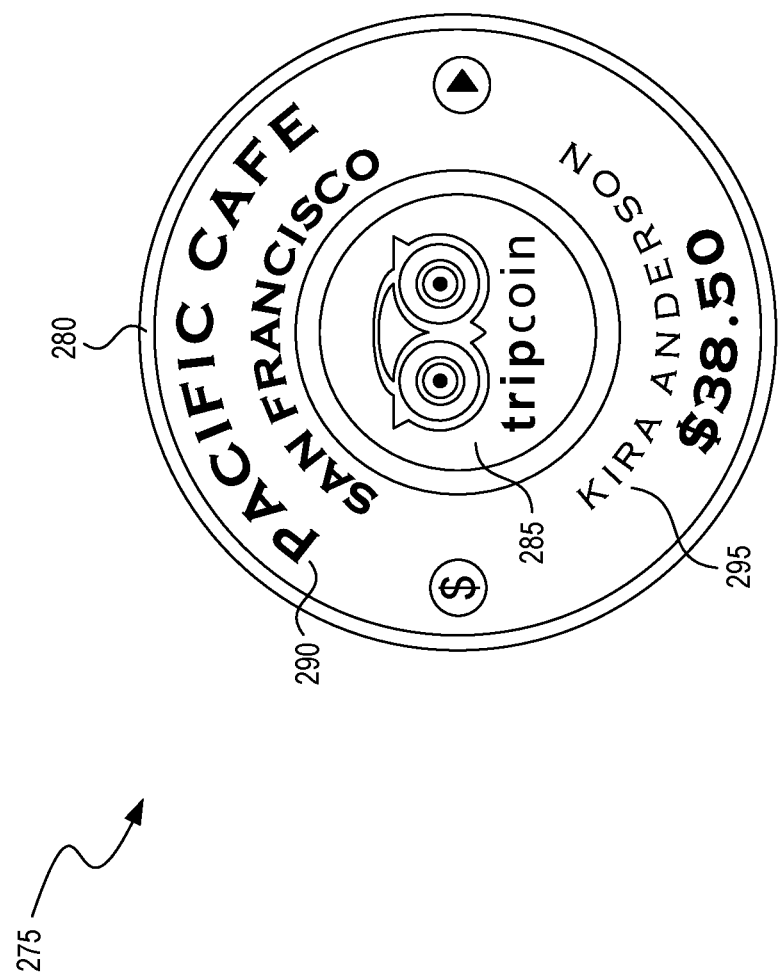
FIG. 2C is a graphical representation of another merchant-generated digital coin, consistent with various embodiments.

FIG. 2C is a graphical representation 275 of a merchant-generated digital coin 280, consistent with various embodiments. In some embodiments, the digital coin 280 is similar to the digital coin 115 of FIG. 1. The digital coin 280 can be generated by a first merchant for use at a second merchant, which can be a partner entity of the first merchant. For example, the first merchant can be an entity which provides review/rating services for restaurants and the second merchant can be a restaurant. The digital coin 280 can be programmed to include a creator attribute 285, which indicates the name of the merchant/partner who created the digital coin 280. The creator attribute 285 can be a text, image, logo, or any other multimedia data. The digital coin 280 can be programmed to include a partner entity attribute 290, which indicates the name of the second merchant at which the digital coin 280 can be redeemed. The digital coin 280 can be programmed to include a recipient attribute 295, which indicates the name of the user to whom the digital coin 280 is transferred/gifted by the first merchant.

Figure 2D:
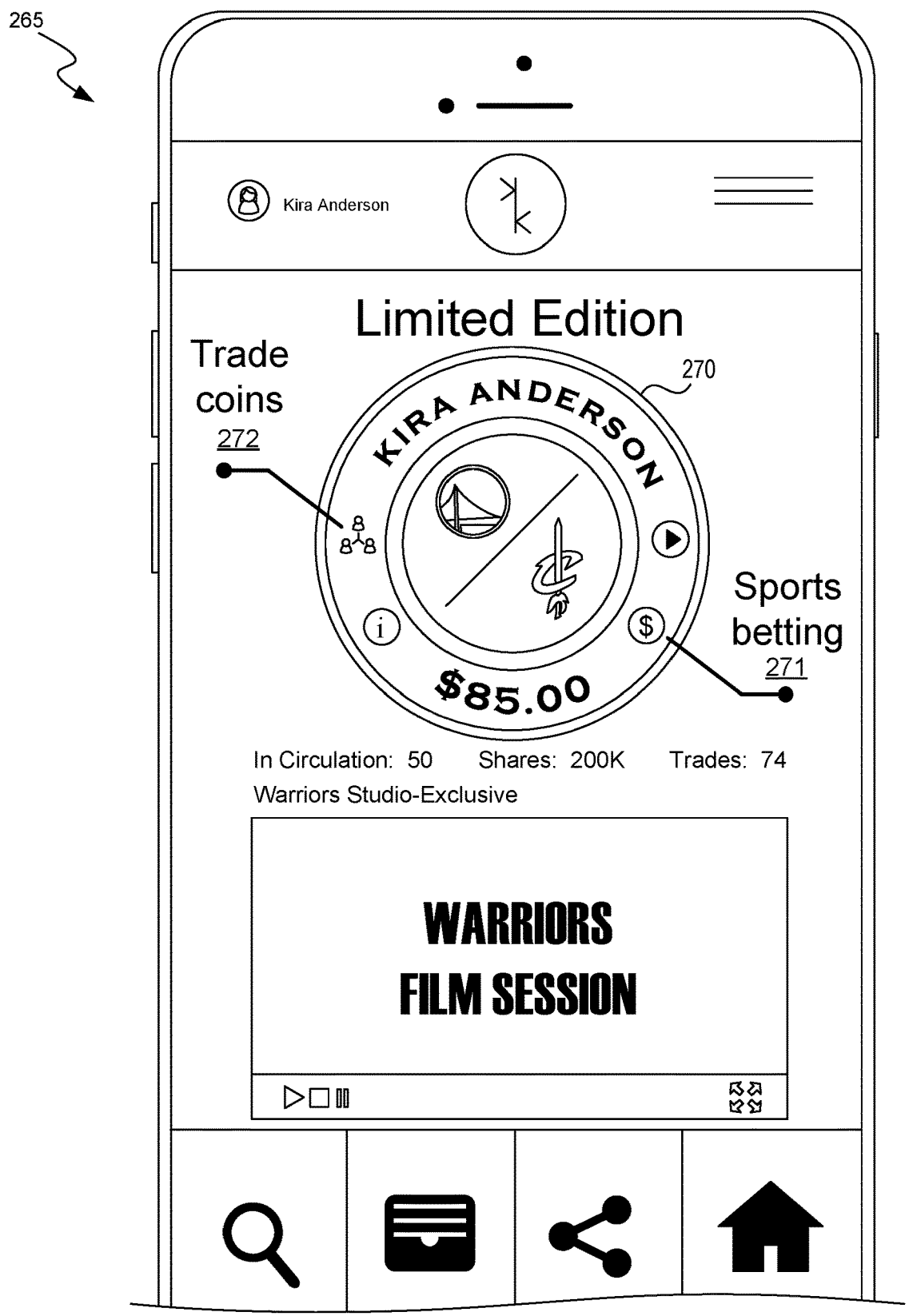
FIG. 2D is a graphical representation 265 of a merchant-generated limited-edition digital coin, consistent with various embodiments.

FIG. 2D is a graphical representation 265 of a merchant-generated limited-edition digital coin 270, consistent with various embodiments. In some embodiments, the digital coin 270 is similar to the digital coin 115 of FIG. 1. The digital coin 270 can be generated by a merchant and in a limited quantity, e.g., a quantity not exceeding a specified threshold. For example, the merchant can generate the digital coin 270 as a game day coin and in limited numbers such as "100." Further, the digital coin 270 can be programmed to have a dynamic value. The merchant will load each of these coins with an initial value, which can dynamically change based on various factors such as number of times the digital coin 270 is shared, the number of times it is redeemed at a particular merchant, the number of points scored by a particular player or team, market forces of supply and demand, as described above at least with reference to FIG. 1. The digital coin 280 can be programmed to include a sports betting attribute 271, which allows the user to place bets. The digital coin 280 can be programmed to include a trading attribute 272, which allows the users to trade the digital coin 270.

Note that the attributes displayed in the graphical representations 205, 250, and 275 are just examples, and a digital coin can have more, less or different attributes than what is illustrated in the foregoing graphical representations.

Figure 3:
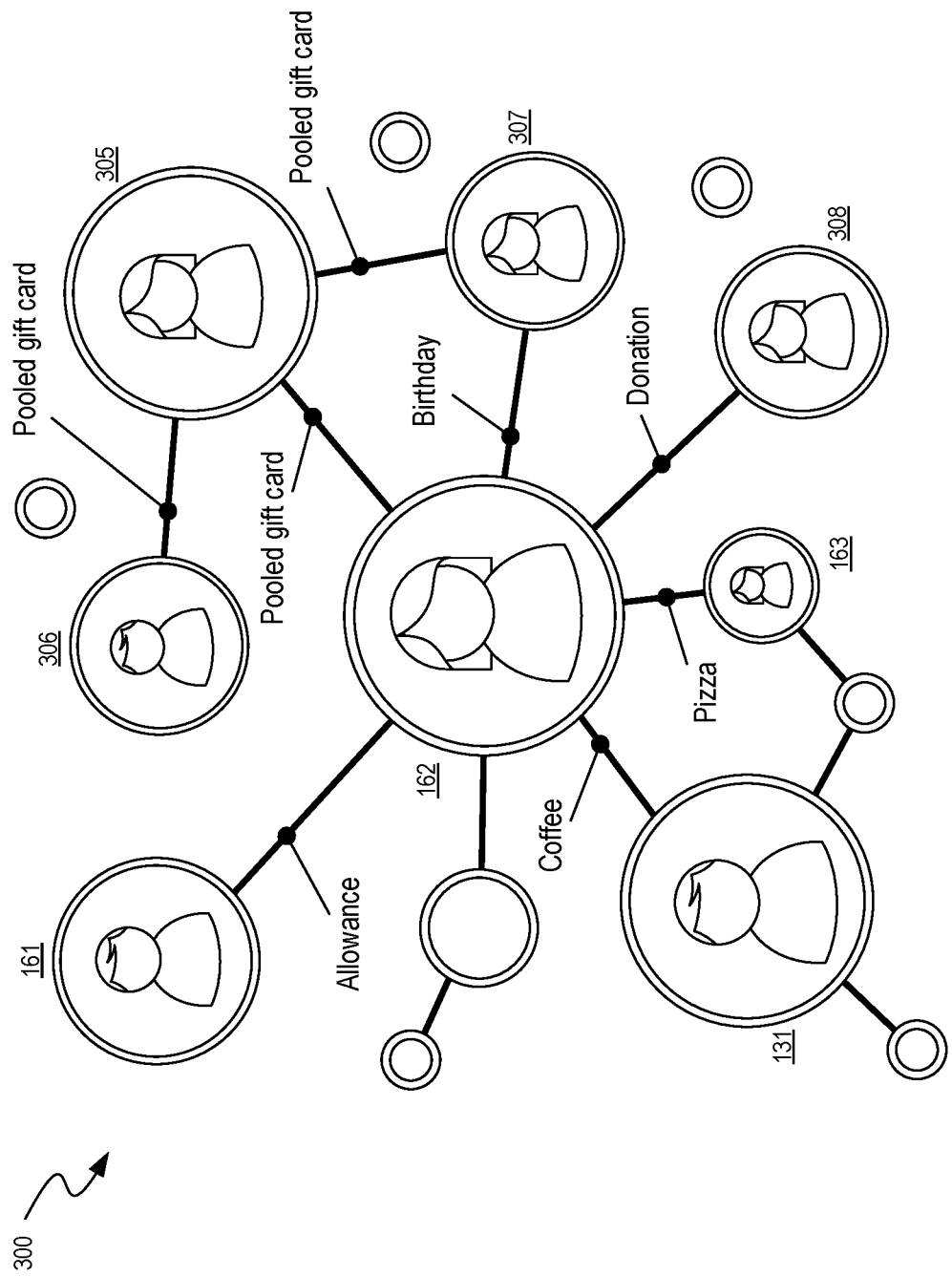
FIG. 3 is a graph depicting various uses of a digital coin, consistent with various embodiments.

FIG. 3 is a graph 300 depicting various uses of a digital coin, consistent with various embodiments. In some embodiments, the graph 300 can be generated by the currency management application 110 of FIG. 1, e.g., in a dashboard, and based on the coin activity. The graph 300 can be a representation of a coin activity associated with a user such as the second user 162. A first user 161, such as a parent of the second user 162, can transfer a digital coin, such as the digital coin 115, to the second user 162. The digital coin generated by the parent has a specified value associated with it and a set of rules that could govern its usage. The second user 162 can use the digital coin 115 for various purposes. For example, in one transaction, the second user 162 can share the digital coin 115 with a user 308 to make a donation. In another transaction, the second user 162 can share the digital coin 115 with the third user 163 via a P2P transfer for sharing her cost for a pizza lunch. In another transaction, the second user 162 can share the digital coin 115 with a user 307 as a gift for birthday. In another transaction, the second user 162 can make a payment to a merchant 131 for buying a coffee. In another transaction, the second user 162 can share the digital coin 115 with a user 305 by making a payment to a request from the user 305 for a pooling money for a gift card. In some embodiments, sharing the digital coin 115 can include sharing a portion of the value of the digital coin 115. Whenever the second user 162 shares her digital coin 115 with another user, the remaining value of the digital coin 115 is adjusted accordingly after the transaction. In some embodiments, the digital coin 115 can be shared if it has enough value for performing a particular transaction.

Figure 4:
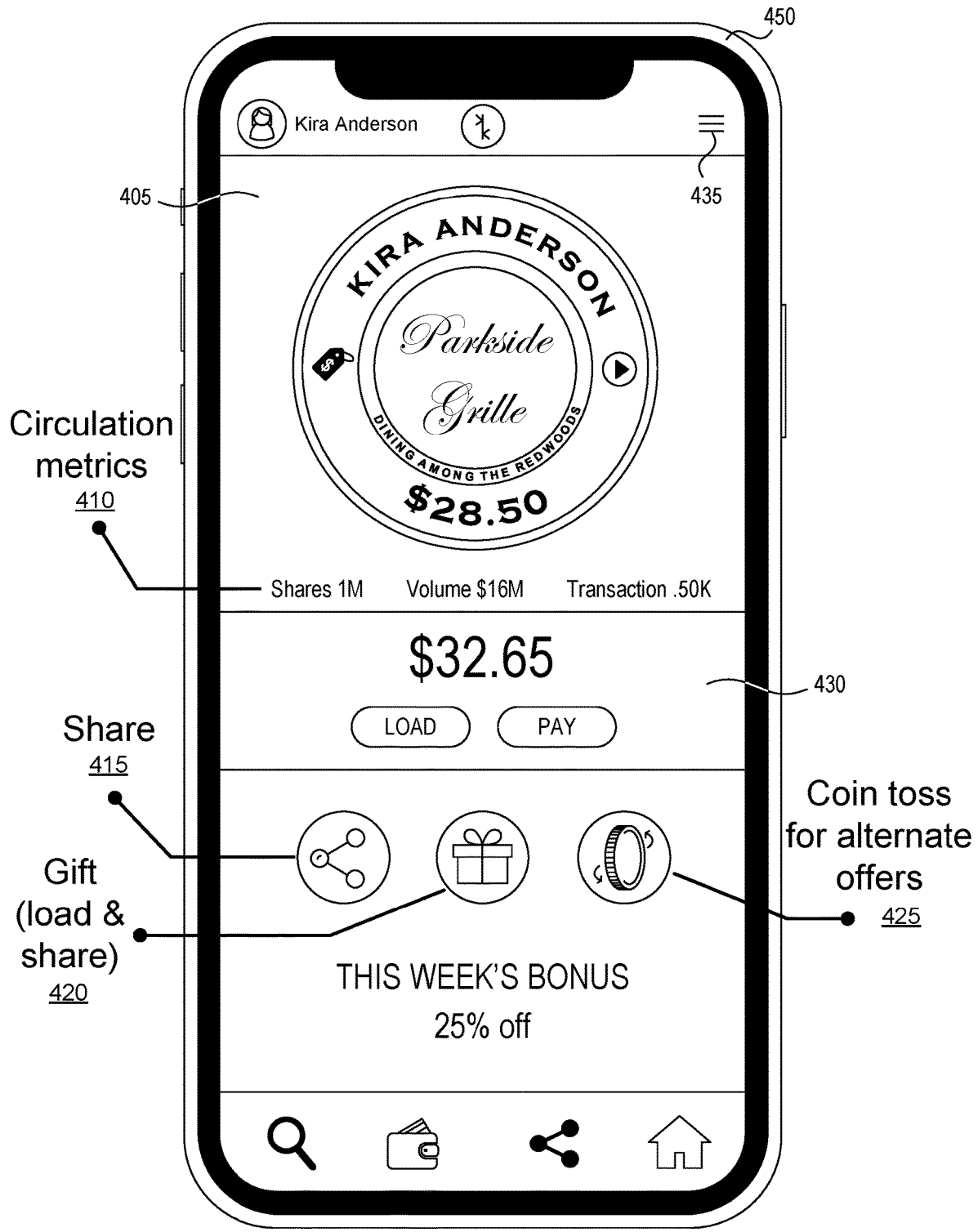
FIG. 4 is an example of a mobile app of a currency management application, consistent with various embodiments.

FIG. 4 is an example of a mobile app of the currency management application 110, consistent with various embodiments. The mobile app 405 can be installed on a client device 450, such as a smartphone. In some embodiments, the client device 450 is similar to the client devices 151-153 of FIG. 1 and the mobile app 405 is similar to mobile apps 110a-110c. The mobile app 405 displays a graphical representation of a digital coin such as the digital coin 255. The mobile app 405 provides a number of digital coin associated functionalities. For example, the mobile app 405 displays circulation metrics 410 associated with the digital coin 255. The circulation metrics 410 can indicate a number times the digital coin 255 of the merchant 131 is shared, the total payment volume of the digital coins 255 (e.g., in terms of fiat currency), and a number of transactions performed using the digital coins 255 of merchant 131. In some embodiments, the mobile app 405 can display global circulation metrics and local circulation metrics associated with the digital coin 255. The global circulation metric can correspond to the circulation metrics for the digital coin 255 determined based on all users who have used the digital coin 255. For example, the global metrics can include a number times the digital coin 255 is shared across users, the total payment volume of the digital coins 255 (e.g., in terms of fiat currency) across all users, and a number of transactions performed using the digital coins 255 by all users. The local circulation metric can be specific to a user. For example, the local metrics can include a number times the digital coin 255 is shared by the first user 161, the total payment volume of the digital coins 255 (e.g., in terms of fiat currency) from the first users 161, and a number of transactions performed using the digital coin 255 by the first user 161.

The mobile app 405 also includes a section 430 that allows the first user 161 to load the digital coin 255 with value and make payments using the digital coin 255. The mobile app 405 includes a share GUI element 415, which allows the first user 161 to share the digital coin 255 with another user, e.g., via an email, a text message, a social network, or in-app. The mobile app 405 includes a gift GUI element 420, which allows the first user 161 to gift (e.g., load the digital coin 255 with value and share) the digital coin 255 to another user. The mobile app 405 includes an offer GUI element 425, which allows the first user 161 to view an offer and/or switch between one or more merchant offers associated with the digital coin 255.

The mobile app 405 can include various other functionalities such as creation of wallet account, logging into and out of wallet account, federated account creation with third parties, viewing offers from nearby merchants, linking funding sources to the wallet account, creating digital coins, customizing/programming digital coins, and viewing a dashboard. These functionalities can be accessed using menu GUI element 435. The mobile app 405 can also include a merchant view, which would include analytics around new user acquisition, influencer loops, usage of merchant issue digital coin, conversion metrics, etc. Note that the functionalities of the mobile app 405 described in FIG. 4 are just examples, and the mobile app 405 can have more, less or different functionalities than what is described above.

Figure 5:
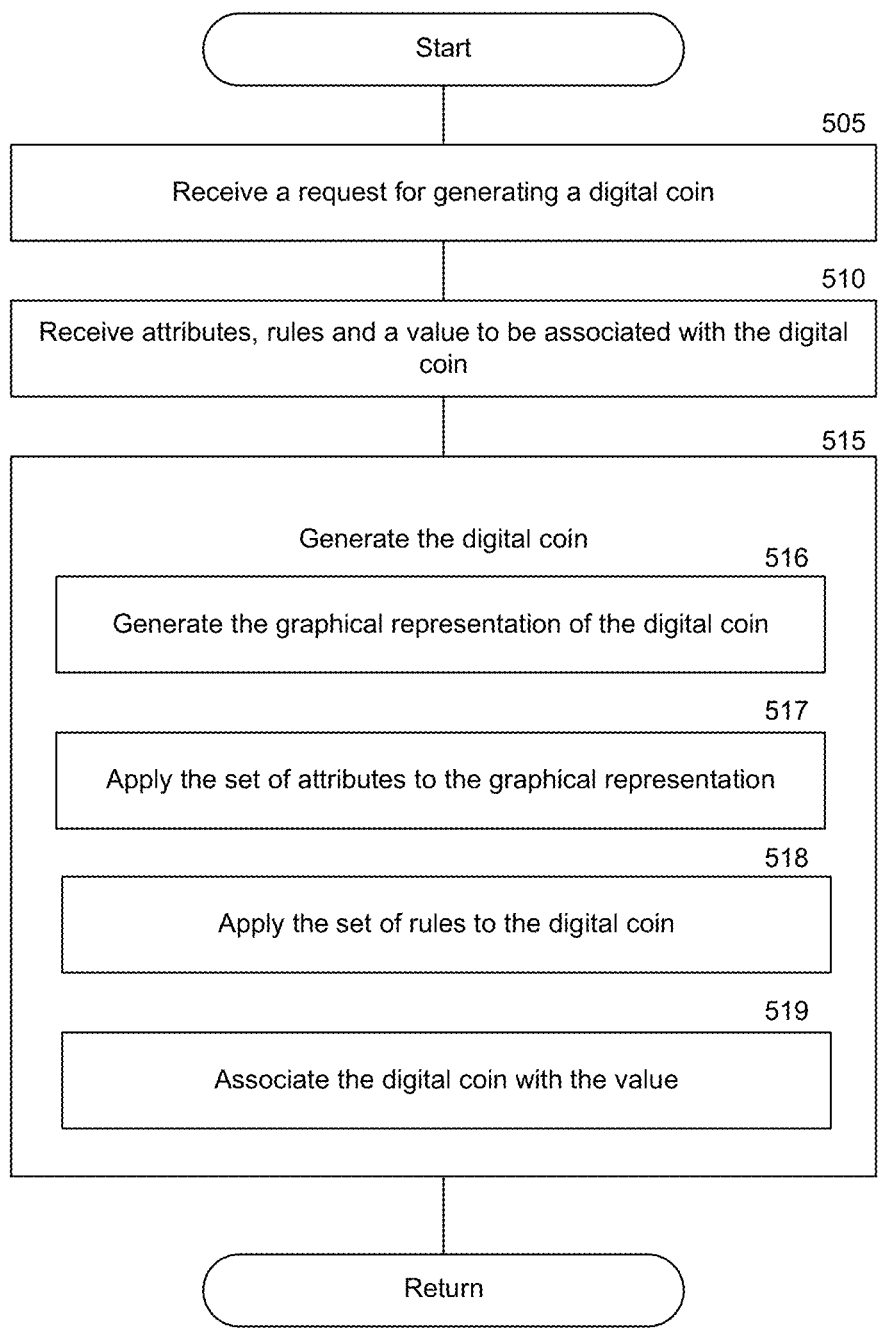
FIG. 5 is a flow diagram of a process for generating a digital coin, consistent with various embodiments.

FIG. 5 is a flow diagram of a process 500 for generating a digital coin, consistent with various embodiments. In some embodiments, the process 500 can be implemented in the environment 100. At block 505, the currency management application 110 receives a request for generating a digital coin from a user. For example, the first user 161 can issue a request for generating the digital coin 115 from the mobile app 110a on the first client device 151.

At block 510, the currency management application 110 can receive a set of attributes, rules and a value to be associated with the digital coin. For example, the first user 161 can input a set of attributes such as a design, color, theme, tags, image, multimedia object, personalized message, etc., using the mobile app 110a. The first user 161 can input a set of rules to be associated with the digital coin 115, such as who can accept the digital coin 115, who can use the digital coin 115, what can the digital coin 115 be used for (e.g., a particular good or service), whether the digital coin 115 be shared, passed or redeemed for goods and services, etc. The first user 161 can also specify an initial value of the digital coin 115, that is, an amount the digital coin 115 has to be loaded with, in fiat and/or crypto.

At block 515, the currency management application 110 can generate the digital coin. In some embodiments, generating the digital coin 115 includes generating a graphical representation of the digital coin (block 516), applying the set of attributes to the graphical representation (block 517), applying the set of rules to the digital coin (block 518) and setting a value of the digital coin (block 519). For example, the mobile app 110a can generate a graphical representation 205 of the digital coin 210 customized with the set of attributes, rules and value as described at least with reference to FIG. 1 and FIGS. 2A-2C.

Figure 6:
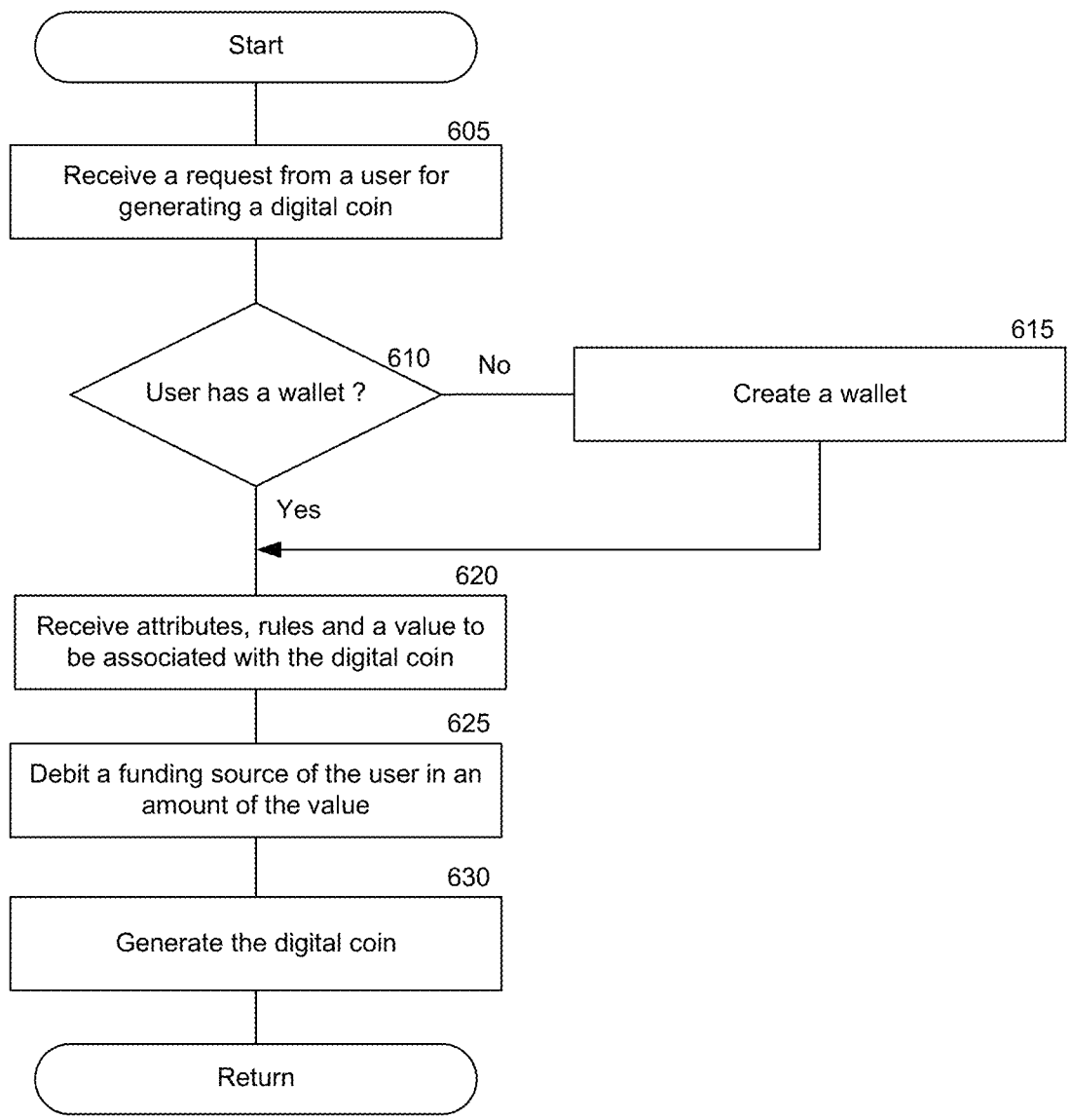
FIG. 6 is a flow diagram of another process for generating a digital coin, consistent with various embodiments.

FIG. 6 is a flow diagram of a process 600 for generating a digital coin, consistent with various embodiments. In some embodiments, the process 600 can be implemented in the environment 100 of FIG. 1. At block 605, the currency management application 110 receives a request for generating a digital coin from a user. For example, the first user 161 can issue a request for generating the digital coin 115 from the mobile app 110a on the first client device 151.

At determination block 610, the currency management application 110 determines if the first user 161 has a wallet account in the currency management application 110. If the first user 161 does not have a wallet account, at block 615, the currency management application 110 prompts the first user 161 to create a wallet account. In some embodiments, creating the wallet account includes signing up in the mobile app 405 using email ID, username or phone number of the first user 161. The first user 161 can also use third-party identity networks to sign up. The first user 161 can complete creating the wallet account by linking a funding source to the wallet account, such as a bank account, credit card, debit card, ACH, private label credit card, prepaid card, another digital coin, cryptocurrency wallet etc.

On the other hand, if the first user 161 has a wallet account in the currency management application 110, at block 620, the currency management application 110 can receive the set of attributes, rules and value to be associated with the digital coin etc. as described at least with reference to FIG. 5.

At block 625, the currency management application 110 can debit an amount corresponding to the value from the funding source of the first user 161. For example, the currency management application 110 communicates with the financial institution system 125 associated with a financial institution, such as a bank, to debit a bank account of the first user 161 for the amount.

At block 630, the currency management application 110 generates the digital coin, e.g., as described at least with reference to FIG. 5.

Figure 7:
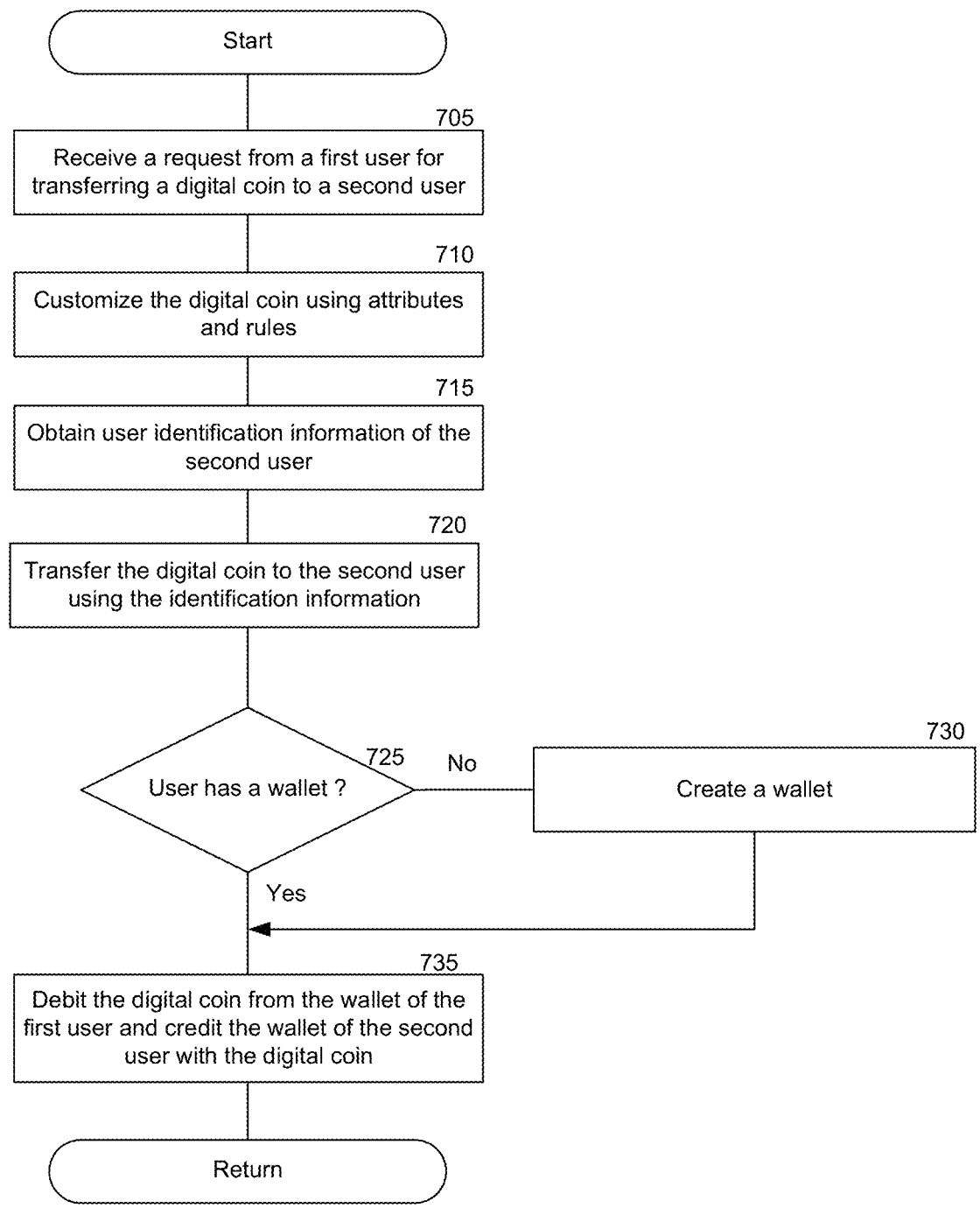
FIG. 7 is a flow diagram of a process for sharing a digital coin, consistent with various embodiments.

FIG. 7 is a flow diagram of a process 700 for sharing a digital coin, consistent with various embodiments. In some embodiments, the process 700 can be implemented in the environment 100 of FIG. 1. At block 705, the currency management application 110 receives a request for transferring a digital coin from one user to another user. For example, the first user 161 can tap the share GUI element 415 of FIG. 4 in the mobile app 110a to transfer the digital coin 115 to the second user 162. In some embodiments, transferring the digital coin includes transferring at least a portion of the value of the digital coin.

At block 710, the currency management application 110 can facilitate the first user 161 to customize the digital coin with attributes, rules, and the value to be transferred, prior to initiating the transfer, e.g., as described at least with reference to FIGS. 1, 2A-2C and 5. In some embodiments, the currency management application 110 may apply a default set of attributes and rules to the digital coin, which the first user 161 may customize further prior to transfer.

At block 715, the currency management application 110 receives user identification information of the second user 162 from the first user 161. For example, the first user 161 can, using the mobile app 110a, provide the user identifiable information of the second user 162 such as email address, mobile phone number, or a social network user ID, from an address book on the first client device 151.

At block 720, the currency management application 110 can transfer the digital coin to the second user 162. The currency management application 110 can transfer the digital coin 115 via email, text message, a third-party social network, or in-app sharing in the mobile app 405.

The second user 162 receives a notification of the transfer on the second client device 152. The second user 162 can access/select the notification to claim the digital coin 115. In some embodiments, the notification can include a link which the second user 162 can select to claim the digital coin 115. Upon selection of the notification, at determination block 725, the currency management application 110 determines whether the second user 162 has a wallet account in the currency management application 110.

If the second user 162 does not have a wallet account, at block 730, the currency management application 110 prompts the second user 162 to create the wallet account, which is described at least with reference to FIG. 6. In some embodiments, upon selecting the notification or the link in the notification, the second client device 152 opens the mobile app 110b if the mobile app 110b is installed on the second client device 152, else the second user 162 is directed to an app store from where the mobile app 110b can be downloaded. The second user 162 can then proceed with wallet creation in the mobile app 110b, e.g., as described at least with reference to FIG. 6.

On the other hand, if the second user 162 has a wallet account, at block 735, the currency management application 110 allows the second user 162 to claim the digital coin. The currency management application 110 debits the digital coin 115 (e.g., in an amount of the value transferred) of the first user 161 and credits the digital coin 115 of the second user 162 (in an amount of the value transferred).

Figure 8:
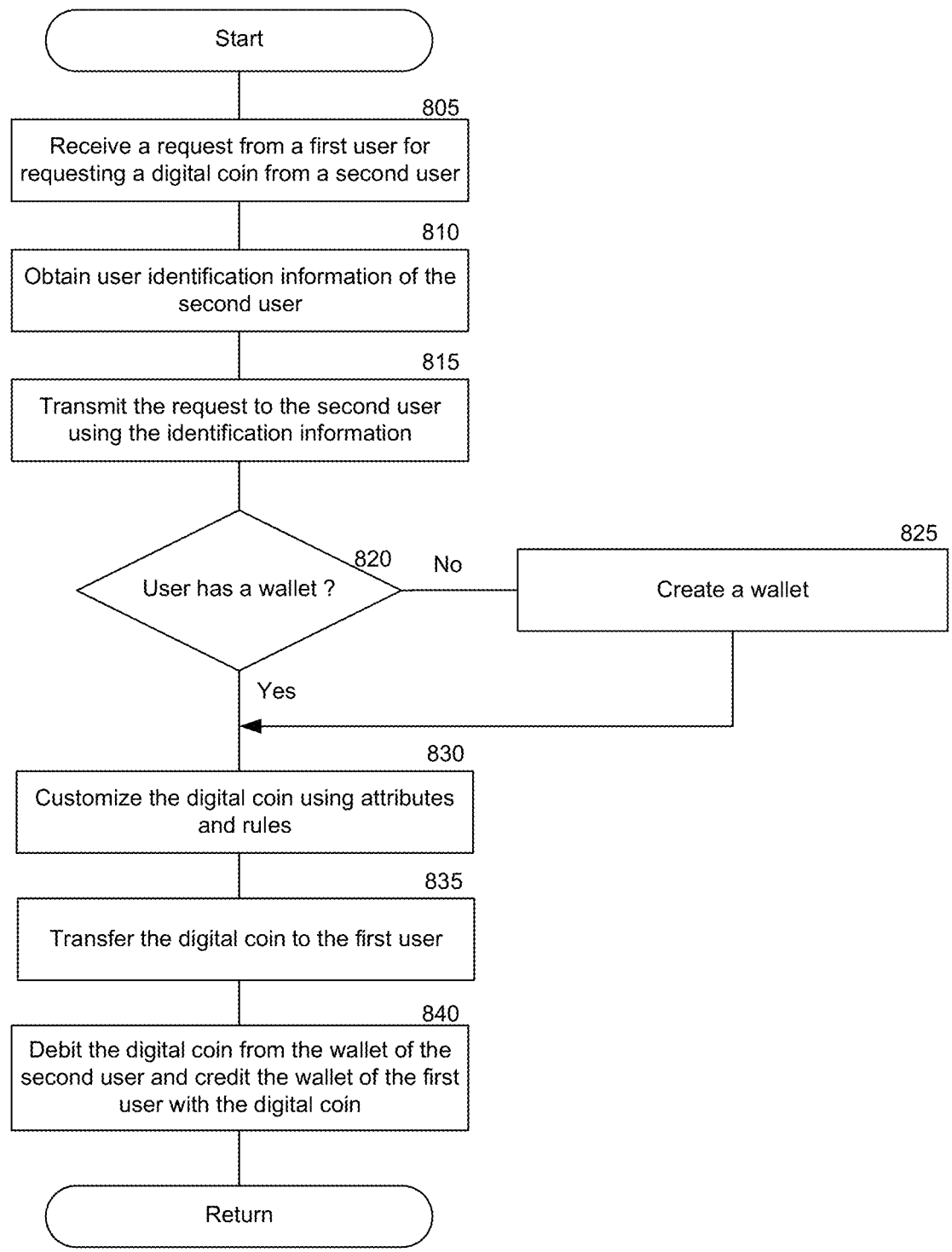
FIG. 8 is a flow diagram of a process for requesting a digital coin, consistent with various embodiments.

FIG. 8 is a flow diagram of a process 800 for requesting a digital coin, consistent with various embodiments. In some embodiments, the process 800 can be implemented in the environment 100 of FIG. 1. At block 805, the currency management application 110 receives a request for requesting a digital coin from a user. For example, the first user 161 can tap the share GUI element 415 of FIG. 4 in the mobile app 110a to request a digital coin from the second user 162.

At block 810, the currency management application 110 receives user identification information of the second user 162 from the first user 161. For example, the first user 161 can, using the mobile app 110a, provide the user identification information of the second user 162 such as email address, mobile phone number, or a social network user ID, from an address book on the first client device 151.

At block 815, the currency management application 110 can transmit the digital coin request to the second client device 152 using the user identifiable information.

The second user 162 receives a notification of digital coin request from the first user 161 on the second client device 152. The second user 162 can access/select the notification on the second client device 152 to share the digital coin 115. In some embodiments, the notification can include a link which the second user 162 can select to share the digital coin 115. Upon selection of the notification, at determination block 820, the currency management application 110 determines whether the second user 162 has a wallet account in the currency management application 110.

If the second user 162 does not have a wallet account, at block 825, the currency management application 110 prompts the second user 162 to create the wallet account, which is described at least with reference to FIGS. 6 and 7.

On the other hand, if the second user 162 has a wallet account, at block 830, the currency management application 110 can facilitate the second user 162 to customize the digital coin with attributes, rules, and the value to be transferred, prior to initiating the transfer, e.g., as described at least with reference to FIGS. 1, 2A-2C and 5. In some embodiments, the currency management application 110 may apply a default set of attributes and rules to the digital coin, which the second user 162 may customize further prior to transfer.

At block 835, the currency management application 110 can allow the second user 162 to transfer the digital coin to the first user 161, e.g., via email, text message, a third-party social network, or in-app sharing in the mobile app 110b.

At block 840, the currency management application 110 debits the digital coin 115 (e.g., in an amount of the value transferred) from the wallet account of the second user 162 and credits the wallet account of the first user 161 with the digital coin 115 (e.g., in an amount of the value transferred).

Figure 9:
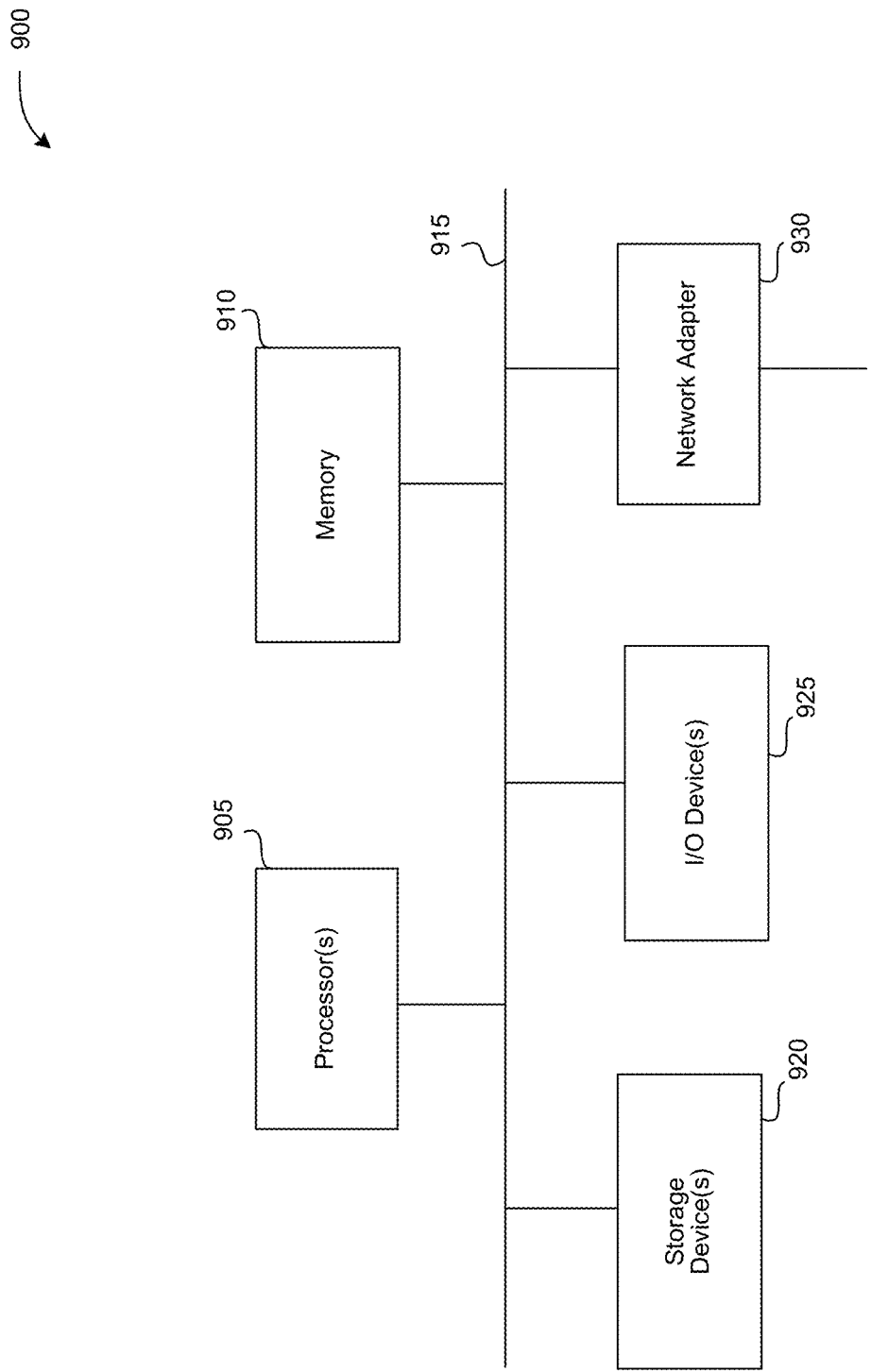
FIG. 9 is a block diagram of a processing system that can implement operations of the disclosed embodiments.

FIG. 9 is a block diagram of a computer system as may be used to implement features of the disclosed embodiments. The computer system 900 may be used to implement any of the entities, modules, components or services depicted in the examples of the foregoing figures (and any other entities, modules, components or services described in this specification). The computer system 900 may include one or more central processing units ("processors") 905, memory 910, input/output devices 925 (e.g., keyboard and pointing devices, display devices), storage devices 920 (e.g., disk drives), and network adapters 930 (e.g., network interfaces) that are connected to an interconnect 915. The interconnect 915 is illustrated as an abstraction that represents any one or more separate physical buses, point to point connections, or both connected by appropriate bridges, adapters, or controllers. The interconnect 915, therefore, may include, for example, a system bus, a Peripheral Component Interconnect (PCI) bus or PCI-Express bus, a Hyper-Transport or industry standard architecture (ISA) bus, a small computer system interface (SCSI) bus, a universal serial bus (USB), IIC (I2C) bus, or an Institute of Electrical and Electronics Components (IEEE) standard 1394 bus, also called "Firewire".

The memory 910 and storage devices 920 are computer-readable storage media that may store instructions that implement at least portions of the described embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non-transitory" media) and computer-readable transmission media.

The instructions stored in memory 910 can be implemented as software and/or firmware to program the processor(s) 905 to carry out actions described above. In some embodiments, such software or firmware may be initially provided to the computer system 900 by downloading it from a remote system through the computer system 900 (e.g., via network adapter 930).

The embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

I claim:

1. A computer-implemented method, comprising:
receiving, at a currency management application executing at a mobile device, from a first user, a request for generating a digital coin, the request including a value of the digital coin, wherein the value is expressed in terms of fiat currency or cryptocurrency;
receiving, at the mobile device and from the first user, a set of rules that defines usage of the digital coin;
receiving, at the mobile device and from the first user, a user-defined set of attributes that defines at least a graphical representation of the digital coin;
generating, at the mobile device, the digital coin based on the user-defined set of attributes and the set of rules, wherein the generating includes:
configuring a visual attribute of the digital coin, the visual attribute
including at least one of a shape, size, color, theme, or template, rendering an image of the digital coin including the visual attribute, adding the digital coin to a wallet account of the first user, and customizing the digital coin based on a collaboration by multiple entities,
wherein the customizing includes:
receiving an additional set of attributes from the first user, and
generating the digital coin based on the user-defined set of attributes and the additional set of attributes received from the first user;
loading, at the mobile device, the value to the digital coin, wherein loading with the value includes:
debiting a funding source of the first user in an amount equivalent to the value, and
loading the value to the digital coin in response to debiting the funding source;
receiving, at the mobile device, a request for using the digital coin for making a payment to a merchant or a second user; and
processing, at the mobile device, the payment using the digital coin, wherein processing the payment includes:
in an event the payment is for the merchant, configuring the digital coin to be redeemed at the merchant using a bar code associated with the digital coin, near field communication, online payment or any proximity-based payment technology, and
in an event the payment is for the second user, receiving user identification information of the second user, and transferring the digital coin to the second user via any of a text message, an email, a social network or the currency management application using the user identification information of the second user.

2. A computer-implemented method, comprising:
receiving, at a computer system and from a first user, a request for generating a digital coin, the request including a value of the digital coin, wherein the value is expressed in terms of fiat currency or cryptocurrency;
receiving, at the computer system and from the first user, a set of rules to be associated with the digital coin, wherein the set of rules defines usage of the digital coin;
receiving, at the computer system and from the first user, a user-defined set of attributes to be associated with the digital coin, wherein the user-defined set of attributes defines at least a graphical representation of the digital coin; and
generating, at the computer system, the digital coin, wherein the generating includes:
configuring, by the computer system, a visual attribute of the digital coin, the visual attribute including at least one of a shape, size, color, theme, or template, rendering an image of the digital coin including the visual attribute, applying the set of rules to the digital coin,
associating the digital coin with the value, and
customizing the digital coin based on a collaboration by multiple entities,
wherein the customizing includes:
receiving an additional set of attributes from the first user, and
generating the digital coin based on the user-defined set of attributes and the additional set of attributes received from the first user.

3. The computer-implemented method of claim 2, wherein associating the digital coin with the value includes:
accessing, by the computer system, a financial institution system to debit a financial account associated with the first user in an amount equivalent to the value, and
associating the digital coin with the value in response to debiting the financial account.

4. The computer-implemented method of claim 2, wherein generating the graphical representation of the digital coin includes:
generating, by the computer system, a representation of a first face and a second face of the digital coin, the digital coin having two faces.

5. The computer-implemented method of claim 2, wherein applying the set of rules to the digital coin includes:
configuring the digital coin with a rule that limits the digital coin to be redeemable at one or more merchants.

6. The computer-implemented method of claim 2, wherein applying the set of rules to the digital coin includes:
configuring the digital coin with a rule that limits the digital coin to be redeemable for at least one of (a) a specified product, or (b) a specified service.

7. The computer-implemented method of claim 2, wherein applying the set of rules to the digital coin includes:
configuring the digital coin with a rule that limits the digital coin to be shareable with at least one of (a) a specified user, or (b) a specified number of users.

8. The computer-implemented method of claim 2, wherein applying the set of rules to the digital coin includes:
configuring the digital coin with a rule that limits an amount of the value of the digital coin that can be redeemed in a transaction.

9. The computer-implemented method of claim 2 further comprising:
receiving a request from the first user to share the digital coin with a second user, and
transmitting the digital coin to the second user.

10. The computer-implemented method of claim 9 further comprising:
receiving, in response to a transaction between the second user and a merchant system associated with a merchant, a request for redeeming the digital coin for a specified transaction amount; and
transmitting the specified transaction amount to the merchant system; and
decreasing the value of the digital coin by the specified transaction amount.

11. The computer-implemented method of claim 9, wherein transmitting the digital coin to the second user includes:
transmitting the digital coin via at least one of a computer-based social network, a text message, an e-mail, or an app installed on a mobile device associated with the first user.

12. The computer-implemented method of claim 2 further comprising:
receiving, from the first user, a request for making a payment of a specified amount to a second user;
generating, in response to the request for making the payment, a specified digital coin with a value of the specified amount; and
transmitting the specified digital coin to the second user.

13. The computer-implemented method of claim 2 further comprising:
receiving a request for generating a specified digital coin; and
generating the specified digital coin with a default set of attributes, default set of rules, and default value.

14. The computer-implemented method of claim 2, wherein generating the digital coin includes:
generating the digital coin using a currency management application executing at a mobile device associated with the first user, and
storing the digital coin in a digital wallet associated with the first user in currency management application.

15. The computer-implemented method of claim 14, wherein the digital wallet includes one or more digital coins received from one or more users of the currency management application.

16. The computer-implemented method of claim 2, wherein generating the digital coin includes:
generating a trending indicator in the graphical representation, wherein the trending indicator indicates a number of digital coins in circulation.

17. The computer-implemented method of claim 2, wherein generating the digital coin includes:
generating a value indicator in the graphical representation, wherein the value indicator indicates a current value of the digital coin.

18. The computer-implemented method of claim 2, wherein generating the digital coin includes:
generating a video indicator in the graphical representation, wherein the video indicator, upon user selection, displays a video associated with the digital coin.

19. The computer-implemented method of claim 2, wherein generating the digital coin includes:
generating a rules indicator in the graphical representation, wherein the rules indicator, upon user selection, displays the set of rules associated with the digital coin.

20. The computer-implemented method of claim 2, wherein generating the digital coin includes:
generating a virtual card that is representative of the digital coin.

21. The computer-implemented method of claim 20, wherein generating the virtual card includes:
integrating the virtual card with a mobile payment application on a mobile device associated with the first user.

22. The computer-implemented method of claim 2, wherein generating the digital coin includes:
generating a digital wallet associated with the first user in currency management application to store the digital coin,
transferring the digital coin from a first user account of the first user in the currency management application to a second user account of a second user in the currency management application, wherein the first user and the second user share a parent-child relationship in the currency management application, wherein the second user account is linked to the digital wallet of the first user,
receiving one or more transactions associated with the digital coin from the second user account, and updating the digital wallet to in response to the one or more transactions from the second user account.

23. A computer-implemented method, comprising:
receiving, at a computer system and from a merchant associated with a merchant system, a request for generating multiple digital coins;
generating, at the computer system and by the merchant, the digital coins, wherein the generating includes:
configuring, by the computer system, a user-defined set of attributes to each of the digital coins,
wherein the user-defined set of attributes includes a visual attribute of a digital coin of the digital coins, the visual attribute including at least one of a shape, size, color, theme, or template,
rendering an image of the digital coin including the visual attribute, applying a set of rules to the digital coins, wherein the set of rules defines the usage of the digital coins,
associating each of the digital coins with an initial value, and
customizing a first set of digital coins of the digital coins based on a collaboration by multiple entities, wherein the customizing includes:
receiving an additional set of attributes from the first user, and
generating the first set of digital coins based on the user-defined set of attributes and the additional set of attributes received from the first user; and
transmitting, by the computer system and from the merchant, the first set of digital coins to a first user.

24. The computer-implemented method of claim 23, wherein applying the set of rules includes:
configuring, by the computer system, at least one of (a) a rule that limits the first set of digital coins to be redeemable at the merchant or one or more partners of the merchant, at a specified location, for a specified product or for a specified service, or (b) a rule that limits a number of users the first user can share the first set of digital coins with.

25. The computer-implemented method of claim 23 further comprising:
receiving, from the first user, a sharing request for sharing the first set of digital coins with a first set of users; and
distributing, in response to the sharing request, the first set of digital coins among the first set of users.

26. The computer-implemented method of claim 23 further comprising:
recording, by the computer system, coin activity of the first set of digital coins, the coin activity representative of transactions involving the first set of digital coins.

27. The computer-implemented method of claim 26, wherein the coin activity includes at least one of:
a date and time a digital coin of the first set of digital coins is shared by the first user with one of the first set of users and/or by the one of the first set of users with another user,
a date and time the digital coin is redeemed at the merchant or one or more merchants,
a name or type of the merchant the digital coin is redeemed at or a name of a user the digital coin was shared with,
a type of a product or service the digital coin is redeemed for, or
a transaction amount associated with the digital coin.

28. The computer-implemented method of claim 26 further comprising:
generating, by the computer system, a dashboard graphical user interface (GUI), wherein the dashboard GUI displays a heat map of the coin activity in a specified location or a geo-spatial velocity graph of the coin activity.

29. The computer-implemented method of claim 26 further comprising:
analyzing, by the computer system, the coin activity to determine whether the first user is an influencer for the merchant, wherein the first user is determined as the influencer for the merchant if the coin activity satisfies a specified criterion.

30. The computer-implemented method of claim 23 further comprising:
receiving a digital coin of the first set of digital coins in a first mobile device associated with the first user, and
generating a bar code for the digital coin, wherein the first user can redeem the digital coin at the merchant using the bar code, near field communication, online payment or any proximity-based payment technology.

31. The computer-implemented method of claim 23 further comprising:
receiving a request for a digital coin of the first set of digital coins from the first user, wherein the request for the digital coin is received from a second user, a specified merchant, an Internet of Things (IoT) device, or a computing device; and
in response to receiving the request, transferring the digital coin from the first user to the second user.

32. The computer-implemented method of claim 31, wherein transferring the digital coin from the first user to the second user includes:
determining whether the second user has a digital wallet associated with a currency management application,
in response to determining that the second user does not have the digital wallet, transmitting a notification to a computing device associated with the second user to create the digital wallet in the currency management application, and
transferring the digital coin from a digital wallet of the first user to the digital wallet of the second user.

33. The computer-implemented method of claim 23, wherein generating the digital coins includes:
generating a digital coin that expires if not redeemed or shared within a period specified by a creator of the digital coin.

34. The computer-implemented method of claim 23, wherein associating each of the digital coins with the initial value includes:
configuring a digital coin of the first set of digital coins to adjust a current value dynamically based on coin activity of the first set of digital coins.

35. The computer-implemented method of claim 34, wherein configuring the digital coin to adjust the current value dynamically includes:
adjusting the current value in an event a number of times the digital coin is shared between multiple users meets a specified threshold.

36. The computer-implemented method of claim 23, wherein generating the digital coins includes:
generating a first digital coin of the digital coins in a computing device associated with the first user using augmented reality feature, wherein the first digital coin is generated in response to one or more activities performed by the first user using the computing device, and wherein the first digital coin is generated when the first user is located at a location specified by a creator of the first digital coin.

37. The computer-implemented method of claim 23, further comprising:
generating global metrics and local metrics associated with the digital coins, wherein the global metrics include metrics associated with the usage of the digital coins among a number of users, and wherein the local metrics include metrics associated with the usage of the digital coins by the first user.

38. A non-transitory computer-readable storage medium storing computer-readable instructions, execution of which by a processor of a computing system causes the computing system to perform operations comprising:
instructions for receiving, at the computer system and from a merchant associated with a merchant system, a request for generating multiple digital coins;
instructions for generating, at the computer system and by the merchant, the digital coins, wherein the generating includes:
configuring, by the computer system, a user-defined set of attributes to each of the digital coins,
wherein the user-defined set of attributes includes a visual attribute of a digital coin of the digital coins, the visual attribute including at least one of a shape, size, color, theme, or template,
rendering an image of the digital coin including the visual attribute,
applying a set of rules to the digital coins, wherein the set of rules defines the usage of the digital coins,
associating each of the digital coins with an initial value, and
customizing a first set of digital coins of the digital coins based on a collaboration by multiple entities, wherein the customizing includes:
receiving an additional set of attributes from the first user, and
generating the first set of digital coins based on the user-defined set of attributes and the additional set of attributes received from the first user; and
instructions for transmitting, by the computer system and from the merchant, the first set of digital coins to a first user;
instructions for receiving, at a currency management application executing at a first mobile device associated with the first user, a request for transferring a digital coin of the first set of digital coins to a second user, wherein the digital coin is associated with a value, the value determined in fiat currency or cryptocurrency,
instructions for rendering an image of the digital coin including the visual attribute;
instructions for determining whether the second user has a mobile wallet associated with the currency management application;
instructions for transmitting, in response to determining that the second user does not have the mobile wallet, a notification to a second mobile device associated with the second user to create the mobile wallet in the currency management application; and
instructions for transferring, in response to determining that the second user has created the mobile wallet, the digital coin from a mobile wallet of the first user to the mobile wallet of the second user.

39. The non-transitory computer-readable storage medium of claim 38 further comprising:

instructions for updating a ledger associated with the currency management application to debit the mobile wallet of the first user with the digital coin and credit the mobile wallet of the second user with the digital coin.

40. The non-transitory computer-readable storage medium of claim 39, wherein the instructions for updating the ledger include:
instructions for managing the ledger using blockchain technology.

41. The non-transitory computer-readable storage medium of claim 38 further comprising:
instructions for receiving a request from the second user to split the digital coin into two or more digital coins, and
instructions for generating the two or more digital coins, wherein a sum of values of the two or more digital coins is equal to the value of the digital coin.

42. The non-transitory computer-readable storage medium of claim 38 further comprising:
instructions for receiving a request from the second user to merge the digital coin with one or more digital coins having the same set of attributes and the set of rules, and
instructions for generating a specified digital coin, wherein a value of the specified digital coin is equal to a sum of values of two or more digital coins.

43. A system, comprising:
a processor; and
a memory storing instructions which, when executed by the processor, performs a method of:
receiving, from a first user, a request for generating a digital coin, the request including a value of the digital coin, wherein the value is expressed in terms of fiat currency or cryptocurrency;
receiving, from the first user, a set of rules to be associated with the digital coin, wherein the set of rules defines a usage of the digital coin;
receiving, from the first user, a user-defined set of attributes to be associated with the digital coin, wherein the user-defined set of attributes defines at least a graphical representation of the digital coin;
generating the digital coin by:
configuring a visual attribute of the digital coin, the visual attribute including at least one of a shape, size, color, theme, or template,
rendering an image of the digital coin including the visual attribute, applying the set of rules to the digital coin,
associating the digital coin with the value, and
customizing the digital coin based on a collaboration by multiple entities, wherein the customizing includes:
receiving an additional set of attributes from the first user, and
generating the digital coin based on the user-defined set of attributes and the additional set of attributes received from the first user.

44. A system, comprising:
means for receiving, from a first user, a request for generating a digital coin, the request including a value of the digital coin, wherein the value is expressed in terms of fiat currency or cryptocurrency;
means for receiving a set of rules to be associated with the digital coin, wherein the set of rules defines the usage of the digital coin;
means for receiving a user-defined set of attributes to be associated with the digital coin, wherein the user-defined set of attributes defines at least a graphical representation of the digital coin; and means for generating the digital coin, wherein the generating includes:

configuring a visual attribute of the digital coin, the visual attribute including at least one of a shape, size, color, theme, or template, rendering an image of the digital coin including the visual attribute, applying the set of rules to the digital coin, and associating the digital coin with the value, and customizing the digital coin based on a collaboration by multiple entities, wherein the customizing includes:

receiving an additional set of attributes from the first user, and generating the digital coin based on the user-defined set of attributes and the additional set of attributes received from the first user.

* * * * *